United States Patent [19]

Saunders et al.

[11] Patent Number: 5,768,431
[45] Date of Patent: Jun. 16, 1998

[54] VIDEO DATA COMPRESSION

[75] Inventors: Nicholas Ian Saunders; Clive Henry Gillard, both of Basingstoke, United Kingdom

[73] Assignees: Sony Corporation, Tokyo, Japan; Sony United Kingdom Limited, Weybridge, United Kingdom

[21] Appl. No.: 716,062

[22] Filed: Sep. 19, 1996

[30] Foreign Application Priority Data

Oct. 30, 1995 [GB] United Kingdom .................. 9522172

[51] Int. Cl.$^6$ ........................................... G06K 9/00
[52] U.S. Cl. ........................... 382/236; 382/239
[58] Field of Search ........................ 382/168, 232, 382/233, 235, 236, 238, 239, 244, 248, 251, 253, 307, 308, 166, 240, 252, 275, 309; 364/514 R; 348/396, 398, 413, 416, 699, 700, 401, 409, 402; 386/111, 116

[56] References Cited

U.S. PATENT DOCUMENTS

| | | | |
|---|---|---|---|
| 4,987,480 | 1/1991 | Lippman et al. ...................... | 358/13 |
| 5,267,334 | 11/1993 | Normille et al. ..................... | 382/56 |
| 5,488,482 | 1/1996 | Ueda et al. ......................... | 358/339 |
| 5,508,942 | 4/1996 | Agarwal ............................ | 364/514 R |
| 5,565,920 | 10/1996 | Lee et al. ........................... | 348/398 |

*Primary Examiner*—Leo Boudreau
*Assistant Examiner*—Bi Jan Tadayon
*Attorney, Agent, or Firm*—Frommer Lawrence & Haug LLP; William S. Frommer

[57] ABSTRACT

Video data compression apparatus in which successive groups of two or more images are encoded, each encoded group of images including at least one intra-image encoded image and at least one inter-image encoded image. A data quantity allocator allocates respective quantities of output encoded data for each image in the group of images according to an allocation ratio between intra-image encoded images and inter-image encoded images dependent on the quantities of encoded data generated during encoding of a preceding group of images. A scene change in the group of images is detected and the allocation of output encoded data for images in a group of images is reset to a default allocation ratio if a scene change is detected in that group of images. An encoder encodes each image of the group of images in accordance with the quantities of output encoded data allocated to that image.

6 Claims, 9 Drawing Sheets

VIDEO DATA COMPRESSION

DESCRIPTION OF THE PRIOR ART

Some video data compression systems, such as systems defined by the Motion Picture Experts Group II standard (or "MPEG II standard"), use a number of different coding techniques to encode successive pictures of a video signal. The MPEG II standard, described in the ISO/IEC Publication DIS 13818/2, "Information Technology generic coding of motion pictures and associated audio information", March 1995, is incorporated herein by reference.

Typically, the video signal is divided into successive groups of pictures (GOPs). Within each GOP at least one picture is encoded as an "I-picture", or intra-picture, using only information present in that picture itself. This means that I-pictures can later be decoded without requiring information from other pictures, and so provide random entry points into the video sequence. However, the converse of this is that the encoding of I-pictures cannot make use of the similarity between successive pictures, and so the degree of data compression obtained with I-pictures is only moderate.

Further pictures within each GOP may be encoded as "P-pictures" or predicted pictures. P-pictures are encoded with respect to the nearest previous I-picture or P-picture, so that only the differences between a P-picture and the previous P- or I-picture needs to be transmitted. Also, motion compensation is used to encode the differences, so a much higher degree of compression is obtained than with I-pictures.

Finally, some of the pictures within a GOP may be encoded as "B-pictures" or bidirectional pictures. These are encoded with respect to two other pictures, namely the nearest previous I- or P-picture and the nearest following I- or P-picture. B-pictures are not used as references for encoding other pictures, so a still higher degree of compression can be used for B-pictures because any coding errors caused by the high compression will not be propagated to other pictures.

Therefore, in each GOP there are (up to) three classes of picture, I-, P- and B-pictures, which tend to achieve different degrees of compression and so tend to require different shares of the overall available encoded bit stream. Generally, I-pictures require a large share of the available transmission or storage capacity, followed by P-pictures, and followed by B-pictures.

It has been proposed to allocate shares in the available encoded bitstream to individual pictures within a GOP on the basis of the degree of compression obtained for corresponding pictures in a preceding GOP. In this way, the "I:B:P ratio", i.e. the ratio between the numbers of bits allocated to I-, B- and P-pictures in the encoded data stream can be steered in accordance with the image content of the current pictures.

For example, in a sequence of pictures with little or no change between successive pictures, this steering method would result in the available data capacity being concentrated towards the I-pictures. At the opposite extreme, if there is a great deal of image motion between successive pictures, there is likely to be more difference data to be encoded for the B- and P-pictures and so the bit allocation technique would tend to allocate a greater share of the available capacity to B- and P-pictures.

One flaw in this technique, however, is that if a scene change occurs during a GOP, a B- or P-picture might suddenly have much more difference data to be encoded than was the case before the scene change. Also, the ideal I:B:P ratio after the scene change might be quite different to the ideal I:B:P ratio before the scene change. However, the bit allocations between different pictures in the GOP are already set in response to the previous GOP, and so the bit allocations cannot take account of the scene change until the start of the next GOP. This means that the particular picture at which the scene change takes place may have an insufficient allocation of bits to be encoded successfully, and the I:B:P ratio could be dramatically inappropriate until the start of the next GOP.

It is a constant aim in the field of video compression, and an object of this invention, to improve the subjective quality of the encoded (and subsequently decoded) images.

SUMMARY OF THE INVENTION

This invention provides video data compression apparatus in which successive groups of two or more images are encoded, each encoded group of images comprising at least one intra-image encoded image and at least one inter-image encoded image, the apparatus comprising:

a data quantity allocator for allocating respective quantities of output encoded data for each image in the group of images according to an allocation ratio between intra-image encoded images and inter-image encoded images dependent on the quantities of encoded data generated during encoding of a preceding group of images;

means for detecting a scene change in the group of images;

means for resetting the allocation of output encoded data for images in a group of images to a default allocation ratio if a scene change is detected in that group of images; and an encoder for encoding each image of the group of images in accordance with the quantities of output encoded data allocated to that image.

The invention addresses the above problems by the elegantly simple technique of monitoring each GOP for scene changes. If a scene change is detected then the allocation ratio (e.g. the I:B:P ratio) for that GOP is reset to a default value. While the default value may not be the best possible ratio for that GOP, at least it can be selected so that it can give a reasonable quality of encoding for most GOPs.

As defined above, the allocation ratio is at least between intra-image encoded images (e.g. I-pictures) and inter-image encoded pictures (e.g. P- or B-pictures). However, in a preferred embodiment allocation takes place between at least one inter-image encoded image used as a reference for another inter-image encoded image (e.g. a P-picture); and at least one inter-image encoded image not used as a reference for other inter-image encoded images (e.g. a B-picture).

Preferably the apparatus comprises means for detecting a degree of detail in each image of the group of images. This may comprise means for detecting the variance of pixel values in each image of the group of images. This part of the apparatus allows an elegant technique for scene change detection to be employed, by detecting a change of more than a predetermined amount between the degree of detail in successive images. By using this technique, it does not particularly matter whether a real or a spurious (false positive) scene change is in fact detected; if the image content between successive images is such that the image detail (activity) changes by more than the predetermined amount then the steered I:B:P ratio is probably inappropriate in any event.

The invention also provides a method of video data compression in which successive groups of two or more images are encoded, each encoded group of images comprising at least one intra-image encoded image and at least one inter-image encoded image, the method comprising the steps of:

allocating respective quantities of output encoded data for each image in the group of images according to an allocation ratio between intra-image encoded images and inter-image encoded images dependent on the quantities of encoded data generated during encoding of a preceding group of images;

detecting scene changes in the group of images;

resetting the allocation of output encoded data for images in a group of images to a default allocation ratio if a scene change is detected in that group of images; and encoding each image of the group of images in accordance with the quantities of output encoded data allocated to that image.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
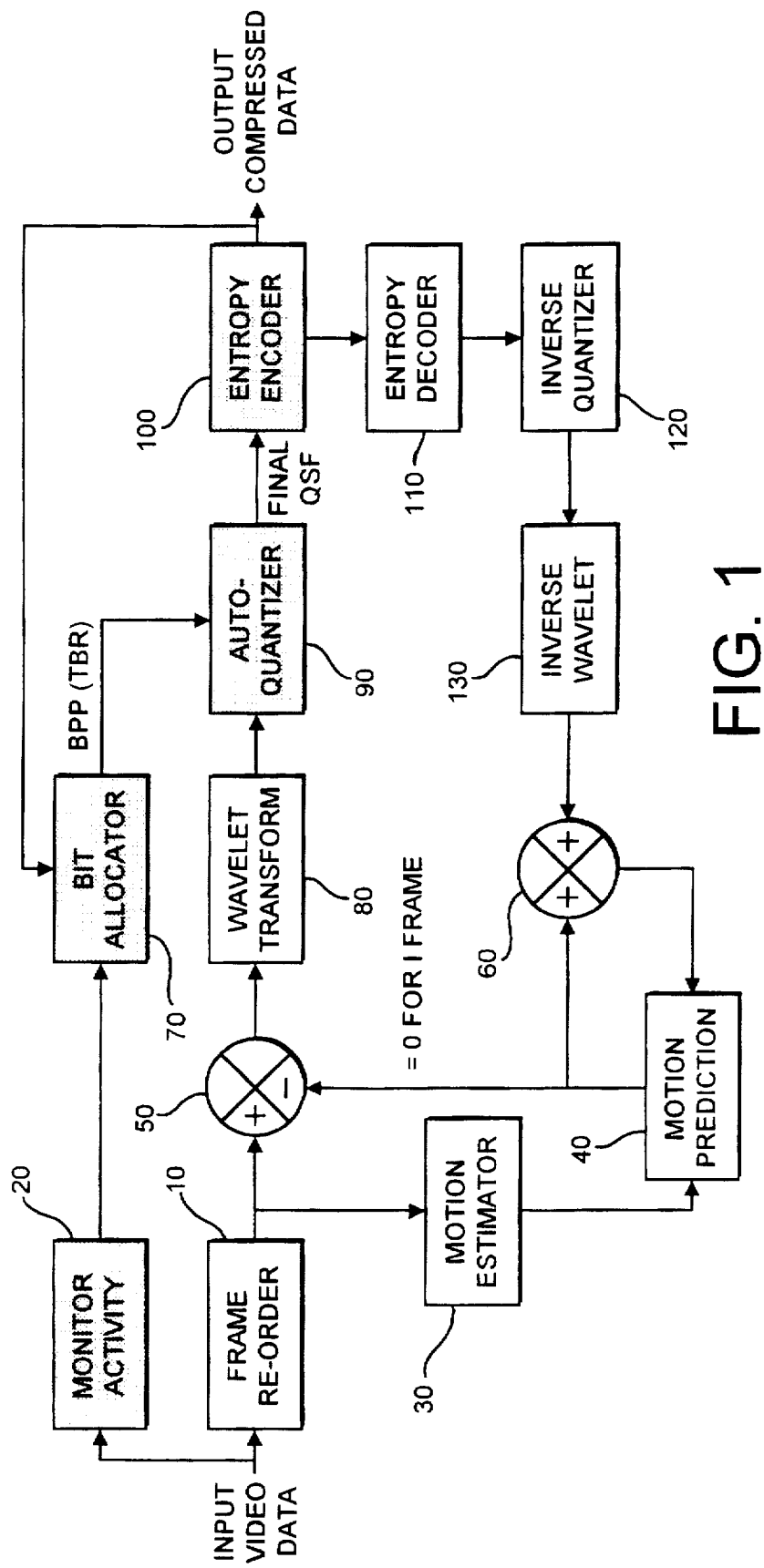
FIG. 1 is a schematic diagram of a video data compression apparatus.

FIG. 1 is a schematic diagram of a video data compression apparatus comprising a frame reorderer 10, an activity detector 20, a motion estimator 30, a motion predictor 40, a subtractor 50, an adder 60, a bit allocator 70, a wavelet transform unit 80, an auto-quantiser 90, an entropy encoder 100, an entropy decoder 110, an inverse quantiser 120 and an inverse wavelet coder 130.

(Where a reference is made in this description to wavelet encoding, it will be appreciated by the skilled man that other encoding techniques, for example the discrete cosine transform or DCT, may be used instead).

Many features of the apparatus of FIG. 1 operate in a very similar manner to corresponding features of an MPEG encoder. Such features will not be described in detail here.

Briefly, therefore, the frame reorderer 10 receives input video data and acts on successive groups of pictures (GOP) to reorder the pictures so that each picture within the GOP is compressed after those pictures on which it depends. For example, if a B-picture (bi-directionally predicted picture) depends on a following I- or P-picture, it is reordered to be compressed after that I- or P-picture.

For example, if a GOP comprises the following four initial frames (in the order in which they are displayed), $I_0B_1B_2P_3$. . ., where the P-picture uses the I-picture as a reference and the two B-pictures use the surrounding I- and P-pictures as references, then the frame reorderer 10 will reorder the GOP to be compressed in the following order: $I_0P_3B_1B_2$. . .

I-pictures are intra-picture encoded, that is to say the encoding is not based on any other reference pictures. An I-picture in a GOP is therefore passed from the frame reorderer 10 to the wavelet transform unit 80, the auto quantiser 90 and the entropy encoder 100 to generate output compressed data representing that I-picture.

The compressed I-picture data is also passed from the entropy encoder 100 through a decompression chain formed by the entropy decoder 110, the inverse quantiser 120, and the inverse wavelet transform unit 130. This reconstructs a version of the I-picture present in the decoder which is passed to the motion predictor 40.

The next picture of the GOP to be compressed, which will generally be a P-picture which depends on the I-picture as a reference, is passed from the frame reorderer 10 to the motion estimator 30 which generates motion vectors indicative of image motion between the I- and P-pictures. The motion predictor 40 then generates a predicted version of the P picture using the motion vectors and the decoded version of the I-picture. This predicted version of the P-picture is subtracted from the actual P-picture by the subtractor 50 and the difference between the 2 frames is passed to the wavelet transform unit 80 for compression. As before, the encoded (compressed) difference data is output by the entropy encoder and is then decoded by the decompression chain 110,120,130 to regenerate a version of the difference data.

In the adder 60 the difference data is then added to the previously decompressed version of the I-picture to generate a decompressed version of the P-picture which is then stored in the motion predictor 40 for use in the compression of the next picture.

This process continues, so that each picture which uses other pictures as a reference is in fact compressed by encoding difference data between the input picture and a version of the input picture formed by motion prediction from a previously compressed and then decompressed version of the reference picture. This means that the compression is performed with respect to the pictures which will be available at the decompressor.

The activity detector 20 detects the image "activity", or "degree of detail" in blocks of each input image. This process will be described in more detail with reference to FIG. 2 below.

The bit allocator 70 allocates target bit rates to whole pictures or blocks of the pictures in dependence on the image activity of pictures of the current GOP and the degree of quantisation obtained for I-, B and P-pictures of the preceding GOP. In fact, the allocation can be made by allocating an overall target bit rate for each GOP (TBR$_{GOP}$) in proportions dependent on the actual quantity of data generated for the corresponding frame in the preceding GOP, or in accordance with the actual I:B:P ratio achieved with the preceding GOP. In this way, the allocation or the I:B:P ratio can be "steered" to reflect the type of image content in use.

The target bits rates are supplied to the auto quantiser 90 which generates a suitable quantisation factor to be applied to the wavelet encoded data to comply with the target bit rates. The auto quantiser will be described in more detail with reference to FIG. 3 below.

Figure 2:
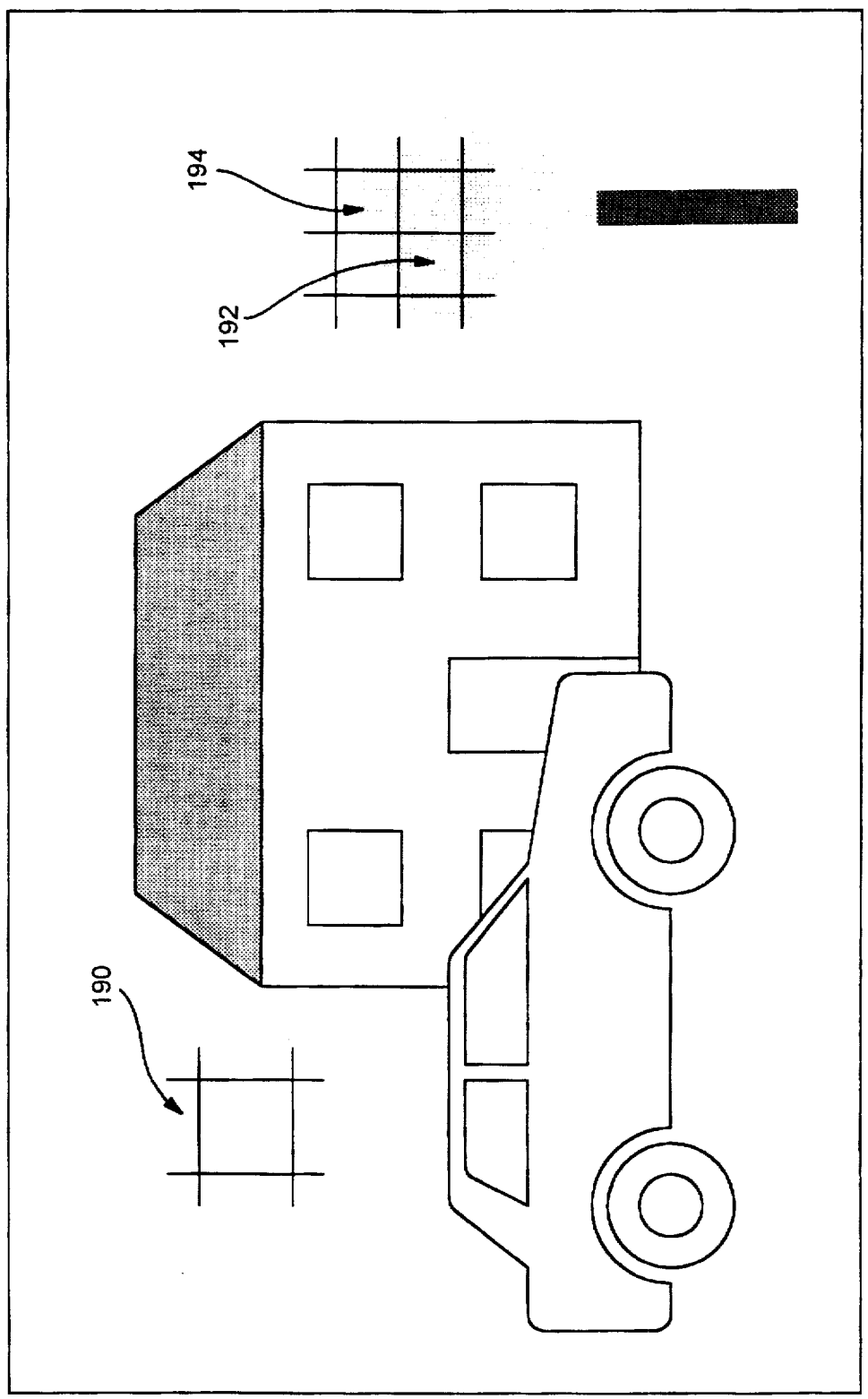
FIG. 2 is a schematic diagram of a video picture illustrating different levels of image activity.

FIG. 2 is a schematic diagram of a video picture illustrating different levels of image activity.

The "activity" of a block of a picture is a measure of the degree of detail in that block. This means that a block representing a plain, bland area of the picture, such as an area of sky 190 in FIG. 2 has a low image activity. A block which includes a great deal of image detail such as an area 192 of the tree in FIG. 1, has a high activity. FIG. 1 also illustrates an intermediate area 194 at the edge of the tree, which has an activity value between that of the block 190 and that of the block 192.

The activity of each block of pixels in the image of FIG. 2 can be measured by determining the variance ($\sigma^2$) of the luminance values of the pixels in that block. The block activity is then derived by dividing the luminance variance for each block by the mean of variances for all of the blocks in the image. This yields a normalised block activity value:

$$\text{block activity} = \frac{\text{block } \sigma^2}{\text{mean } (\sigma^2)}$$

The image activity is monitored and sudden changes of at least a predetermined threshold between successive images of a GOP are detected. This type of sudden change can be indicative of a scene change occurring during the GOP. If such a sudden change is detected, then the bit allocator responds by resetting the "steered" I:B:P ratio to a default value intended to cope reasonably with the image content after the scene change.

A further justification for measuring image activity is that available space in a compressed video data stream can be allocated block-by-block (or by groups of blocks) depending on the respective measured block activities. In other words, the degree of data compression applied to each block or group of blocks is varied depending on the activity measured for that block or group of blocks.

The degree of compression can be varied (by varying the target bit rates supplied to the auto-quantiser 90) in dependence on the activity values because it has been observed that compression artifacts and distortions are more subjectively disturbing in blocks of low detail content (low activity, such as the plain sky area 190) than in blocks of high detail content (high activity, such as the block 192 of the tree in FIG. 2). This is because the high level of detail in a block of high activity tends to distract the eye from the compression artifacts or distortions. Therefore, the target bit rates for areas or blocks of low image activity can be set to be higher than those for areas or blocks of high image activity.

One way of varying the target bit rates in response to the image activity is to increase or decrease the target bit rates by up to, say, 50%, in proportion to the image activity value. Here, the values should be normalised over the entire image or GOP so that the overall effect of the activity-value weighting of the target bit rates does not cause the target bit rates to exceed $TBR_{GOP}$.

Figure 3:
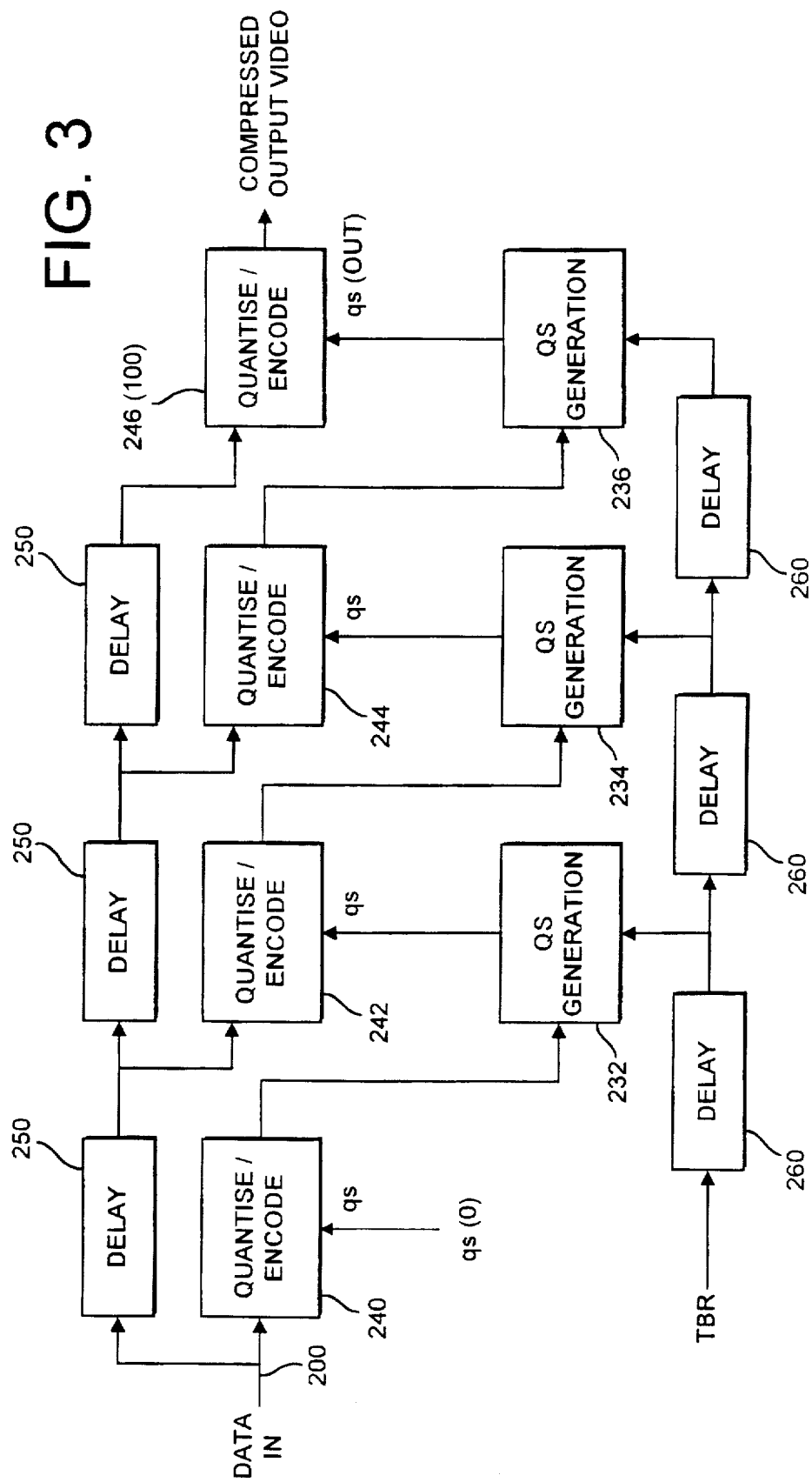
FIG. 3 is a schematic diagram of an auto-quantiser.

FIG. 3 is a schematic diagram of the auto-quantiser 90. (In fact, the apparatus of FIG. 3 performs the function of the auto-quantiser 90 and the entropy encoder 100 of FIG. 1).

The auto-quantiser 90 receives frequency separated video data on an input terminal 200 and an initial quantisation coefficient value, Qs(0), on an input terminal 210.

The initial Qs value, Qs(0), may be a predetermined or preset number such as 64, or could be generated in response to the properties of the current video data being compressed.

The quantiser/encoder 240 quantises the current block of video data using the initial QS value supplied, and either performs a full Huffman coding process on the quantised data or simply detects the length of a variable length code which would result from the Huffman coding process (both of these are known techniques). In this way, the quantiser/encoder detects the amount of data which would result from quantising the input frequency separated video data using the supplied initial QS value.

A Qs generator 232 compares the output bit rate of the quantiser/encoder 240 using the current QS value with the target bit rate for the current picture/area of a picture. If the detected output bit rate is lower than the target bit rate, then the quantisation scale factor should be reduced to apply less harsh quantisation to the frequency separated image data. Conversely, if the detected output bit rate is higher than the target bit rate, the quantisation scale factor should be increased. The qs generator 232 therefore either increases or decreases the initial Qs value, Qs(0) by a predetermined proportion such as 50%, and supplies the modified Qs value, Qs(1) to a second quantiser/encoder 242. Accordingly, if the initial Qs value is 4, then the value qs(1) will be either 2 or 6.

This process is continued at each stage of the auto-quantiser, until the last stage is reached. There the qs value which will result in the quantity of output data being close to but not exceeding the target bit rate for the current picture area is used as qs(out).

The apparatus of FIG. 3 involves a three-stage binary search process to obtain the qs value. It will be appreciated that in practice more stages could be used to define the qs value to a higher resolution.

The final quantisation scale factor generated by this process, QS (out) may simply be output to a separate quantiser and entropy encoder. However, an alternative is illustrated in FIG. 3, where a final quantiser/encoder 246 takes the place of a separate quantiser and the entropy encoder 100 of FIG. 1, to generate the compressed output video.

The selection of the output quantisation scale factor QS (out) can be made for individual blocks of the image e.g. 8×8 blocks of pixels, for groups of blocks, for regions of the image such as "slices" (horizontal strips of the image) or for an entire picture.

Figure 4:
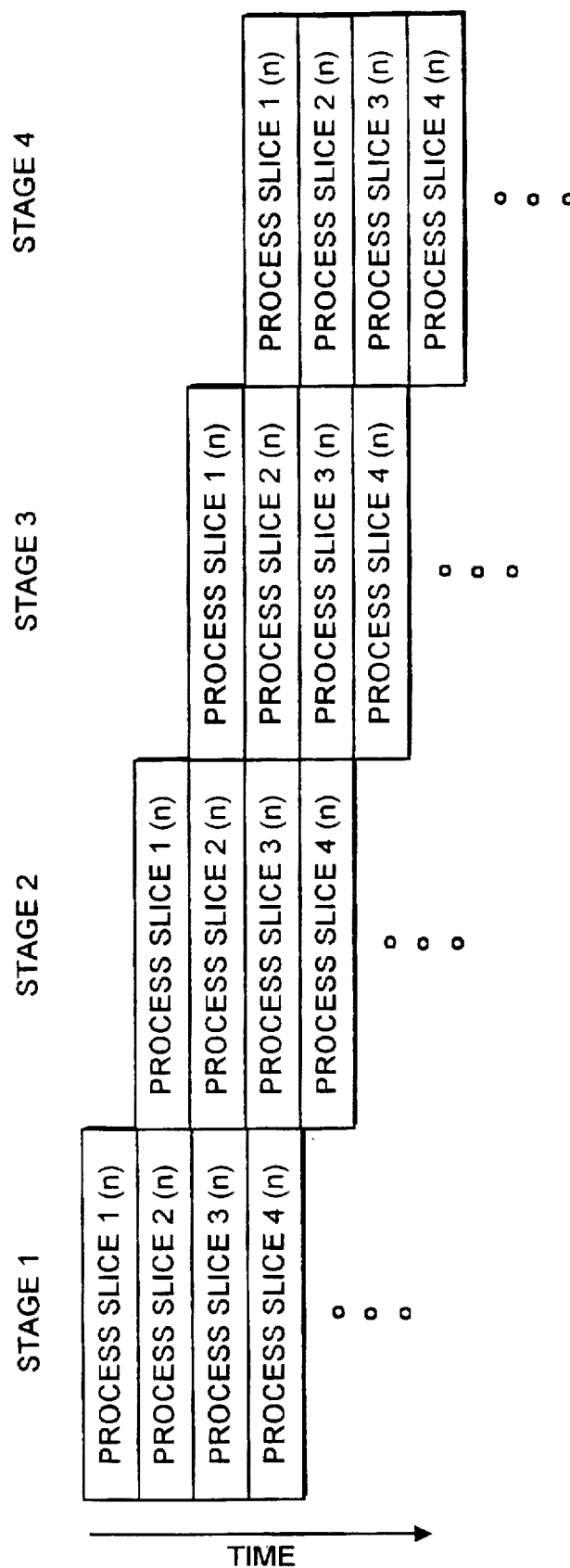
FIG. 4 is a schematic timing diagram illustrating the operation of the auto-quantiser of FIG. 3.

FIG. 4 is a schematic timing diagram illustrating the operation of the auto-quantiser of FIG. 3.

The examples shown in FIG. 4 is that of processing each image as a series of "slices", ie horizontal stripes formed of groups of macroblocks. However, as mentioned above, the staged processing illustrated in FIG. 4 could be performed on various types of blocks of each picture. It is advantageous if the blocks on which the staged processing of FIG. 4 is performed are co-sited with the blocks for which individual target bit rates are defined. In other words, co-sited blocks of the same size or larger that those for which the TBRs are defined are preferred.

The first process is that stage one of the auto quantiser (the quantiser/encoder 240 of FIG. 3) processes a first slice of an image. When that processing is complete, that stage processors second, third, fourth and so on slices of the image.

When the processing of slice 1 has been completed by stage one, stage 2 takes on the processing of slice 1. When this has been completed, stage 3 works on slice 1, and finally when this has been completed, stage 4 works on slice 1. This technique leads to lower delays being caused by the auto-quantiser; if each stage had to wait until a preceding stage had completed processing of a whole image, the 4-stage auto-quantiser of FIG. 3 would have a minimum delay of 4 picture periods. This delay is much reduced using the processing technique with individual blocks.

Figure 5:
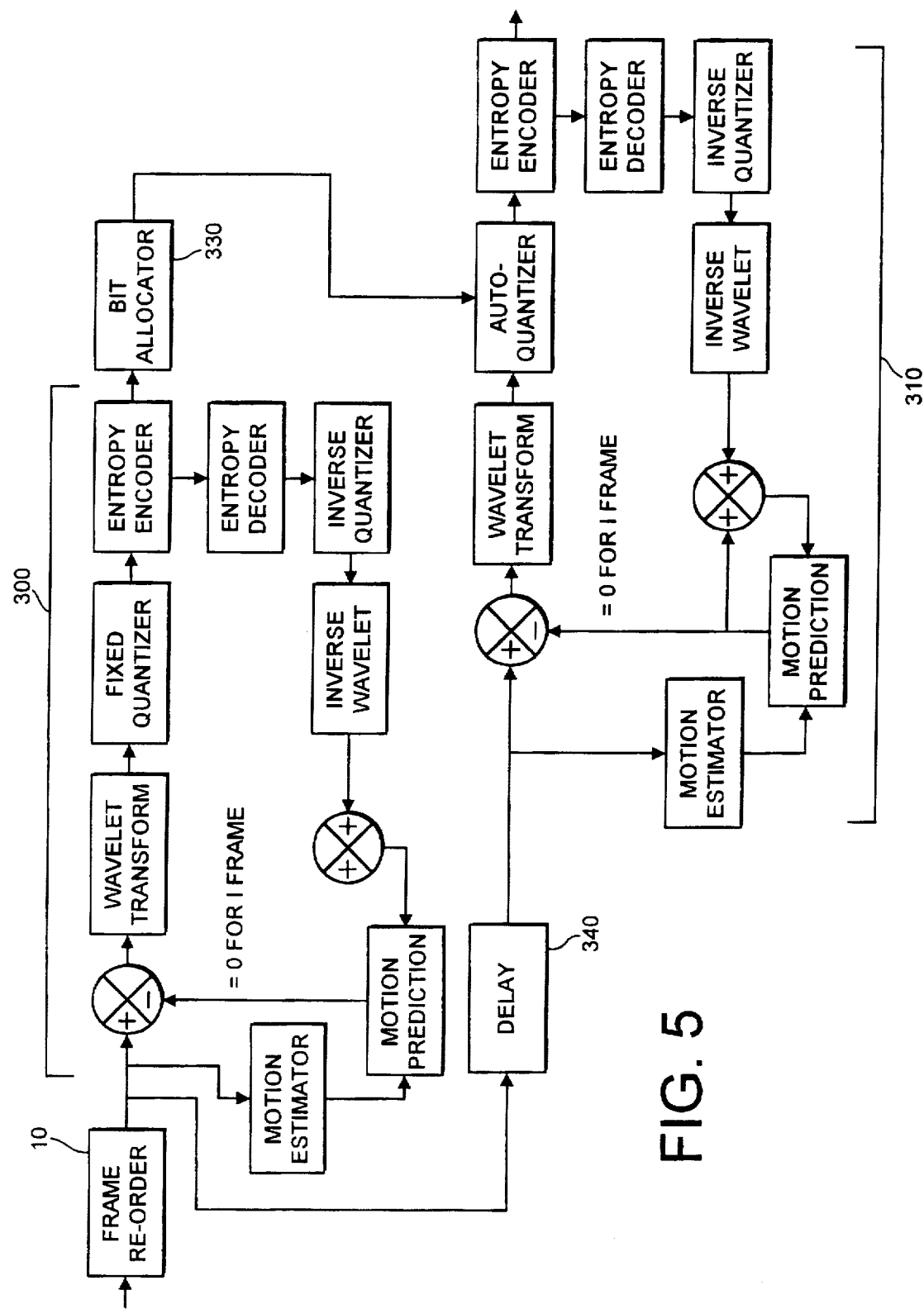
FIG. 5 is a schematic diagram of a second video data compression apparatus.

FIG. 5 is a schematic diagram of a second video data compression apparatus. The apparatus of FIG. 5 no longer uses the activity detector 20 or compression performance results from a previous GOP to set target bit rates for individual pictures of a GOP, but instead performs a trial or rehearsal compression and decompression of at least some of the pictures of each GOP.

The apparatus of FIG. 5 may be considered as a trial encoder 300, which operates in much the same way as the apparatus of FIG. 1, and a final encoder 310, which again operates in much the same way as the apparatus of FIG. 1. The main difference between the trial encoder 300 and FIG. 1 (apart from the lack of the activity detector and bit allocator) is that it uses a fixed quantiser 320 with a predetermined quantising factor.

In operation, the trial encoder 300 compresses a GOP (or at least some of the pictures of a GOP), using a fixed quantisation factor. The purpose of this is to assess the relative quantities of compressed data required by the different pictures or types of picture within the GOP.

While the trial compression is being performed, the GOP is stored in a delay unit 340.

The compressed data output by the entropy encoder of the trial compressor 300 is supplied to a bit allocator 330. The way in which the bit allocator 330 operates depends on whether all or some of the pictures are subject to trial compression.

If all of the pictures of a GOP are subject to trial compression, the bit allocator 330 then allocates target bit rates for final compression in accordance with the ratio of quantities of data generated during trial compression and subject to the overall limit on the storage or transmission channel's capacity (eg 30 Mbps—Mega bits per second). In order words, each picture in a GOP is allocated a quantity of data according to the following derivation:

$$TBR_n = \frac{b_n}{\sum_0^{GOP} b_n} \cdot TBR_{GOP}$$

where $b_n$ is the quantity of trial data generated for the nth picture in the GOP and $TBR_n$ is the target bit rate allocated to the nth picture.

If only some of the pictures in a GOP are subject to trial compression, but that sub set of pictures includes each type of picture present in the GOP, then an I:B:P ratio can be established for use with all pictures in that GOP. An I:B:P ratio, according to which the pictures in the GOP are then allocated quantities of compressed data, is derived using the following formulae:

$$I:B:P = \frac{\sum_{I\text{-pictures}} b_n}{N_{trial}(I)} : \frac{\sum_{P\text{-pictures}} b_n}{N_{trial}(P)} : \frac{\sum_{B\text{-pictures}} b_n}{N_{trial}(B)}$$

Finally, if the GOP contains I, B and P pictures, but only I- and P-pictures are subject to trial compression, a B:P ratio must be used to allocate quantities of data to the B pictures based on that available to I- and P-pictures. This B:P ratio could be fixed, or could be steered using the output of the final entropy encoder of the final compressor 310 having compressed the preceding GOP.

It will be appreciated that the above techniques can also be applied to sub-areas (e.g. blocks or "slices") of the pictures.

Once the bit allocation has been performed by the bit allocator 330, the GOP is passed from the delay unit 340 into the final compressor 310. The auto quantiser of the final compressor 310 controls the degree of quantisation applied to the image data so that the overall bit rate complies with the target bit rates generated by the bit allocator 330.

Figure 6:
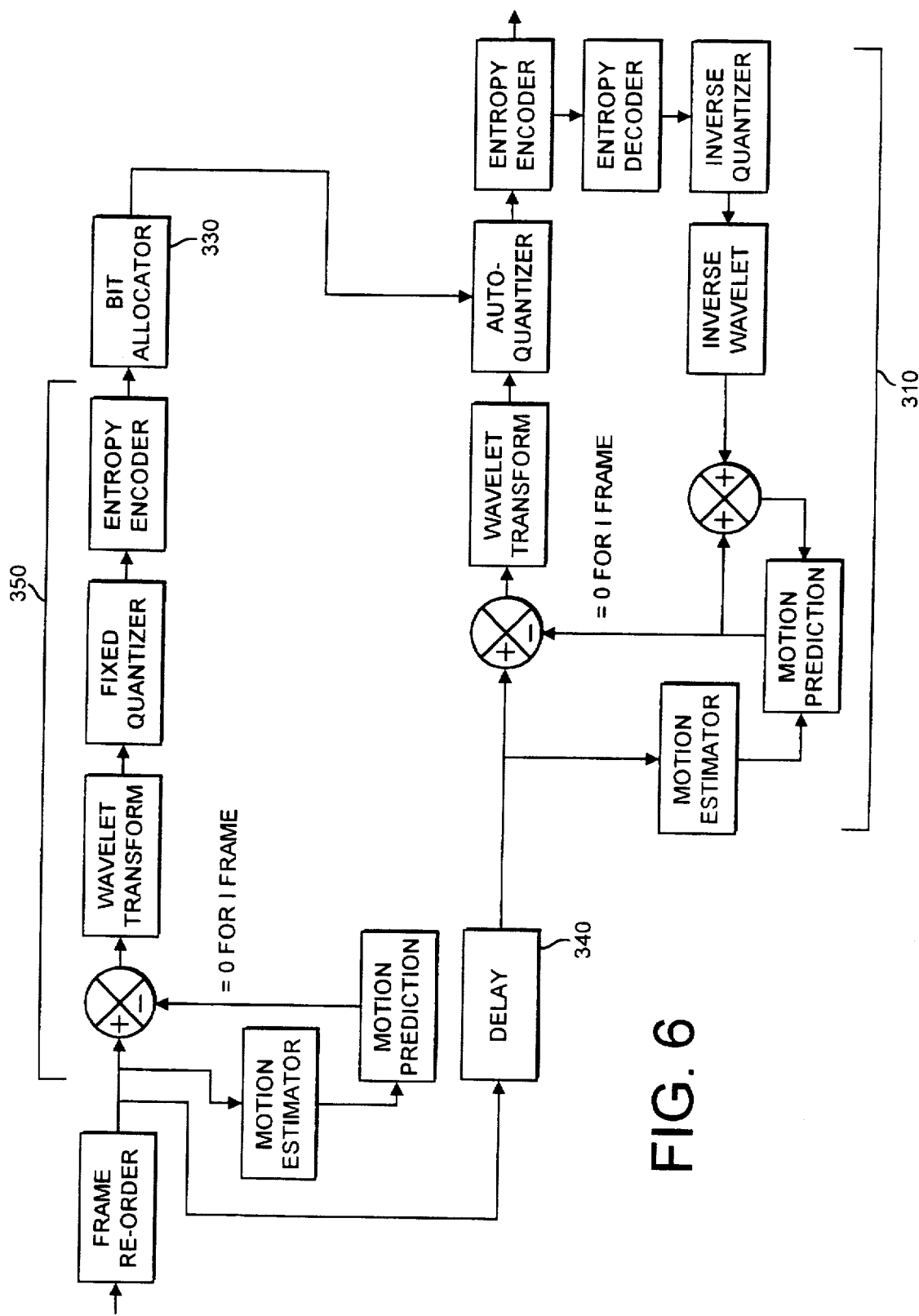
FIG. 6 is a schematic diagram of a third video data compression apparatus.

FIG. 6 is a schematic diagram of a third video data compression apparatus.

Again, the apparatus of FIG. 6 comprises a trial compressor 350 and a final compressor 310, with the trial compressor 350 supplying trial compressed data to a bit allocator 330 to control target bit rates to be used in final compression.

In contrast to the apparatus of FIG. 5, the trial compressor 350 does not have a feedback loop of an entropy decoder, an inverse quantiser and an inverse wavelet coder. Instead, during trial compression, B- and P-pictures are compressed with respect to the input versions of the respective reference pictures. This means that the compression will be slightly less accurate than a full compression using the feedback loop described above, but since the compression is only for the purposes of assessing approximate relative quantities of data required by each picture of the GOP, this slight inaccuracy does not matter and is more than compensated for by a saving in hardware or processing resources.

Figure 7:
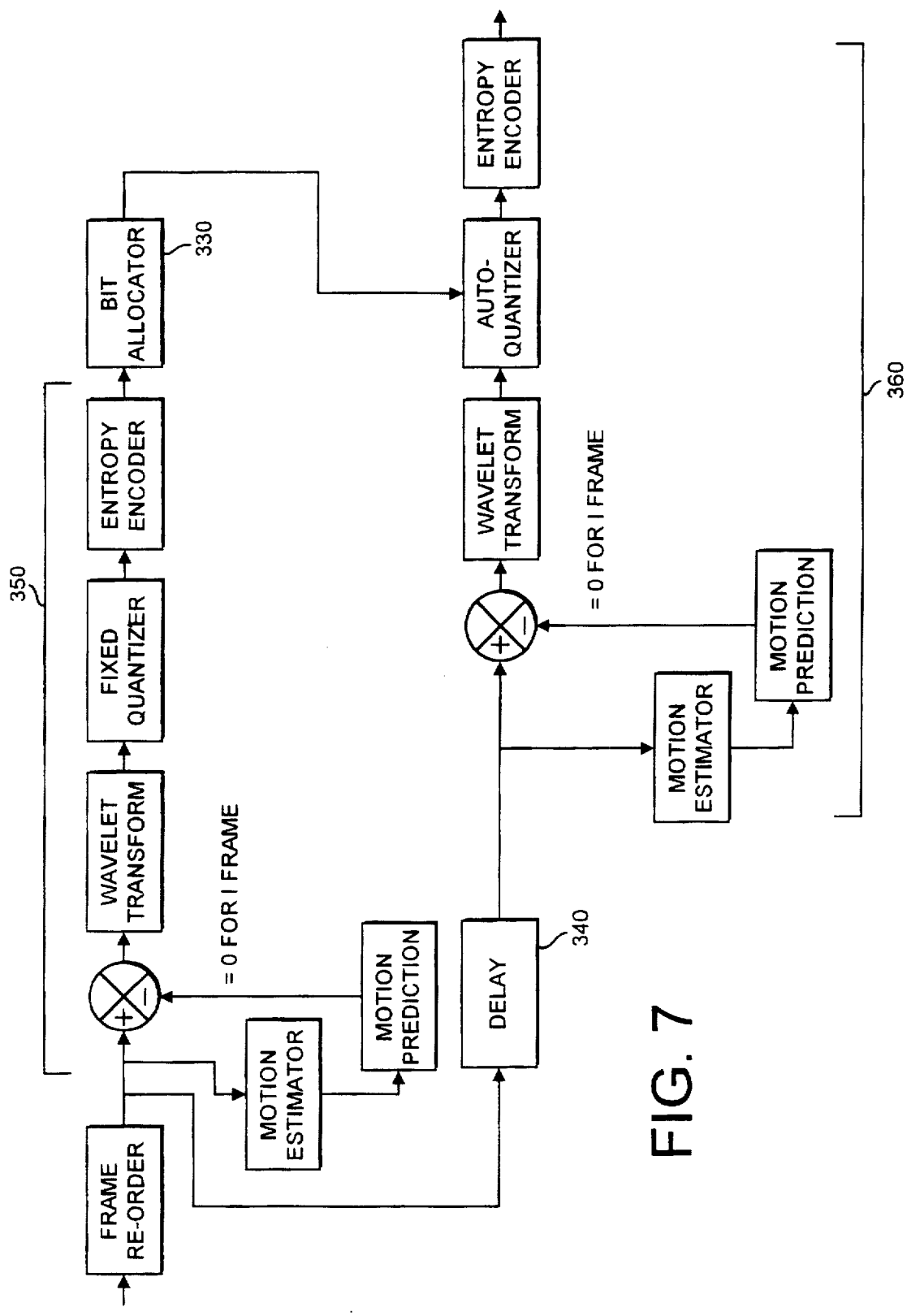
FIG. 7 is a schematic diagram of a fourth video data compression apparatus.

FIG. 7 illustrates a similar arrangement being used in the trial compressor 350 and in a final compressor 360. Again, this can be useful where economy of processing resources is as important as compression accuracy.

Figure 8:
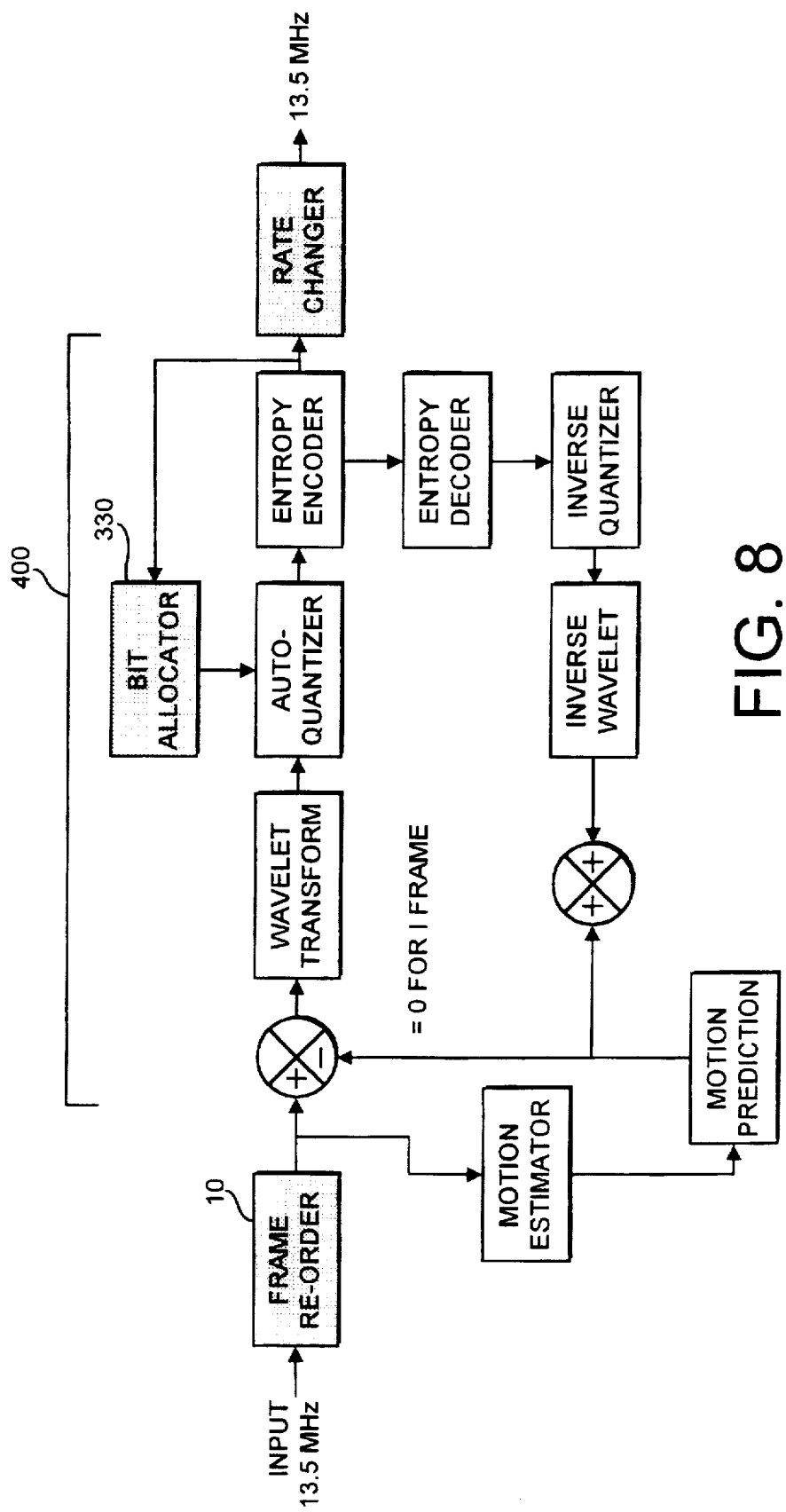
FIG. 8 is a schematic diagram of a fifth video data compression apparatus.

FIG. 8 is a schematic diagram of a fifth video data compression apparatus. This apparatus comprises a single compressor 400 which acts alternately as the trial compressor and the final compressor of any of the embodiments described earlier. This is achieved by running the processing of the compressor 400 at a faster speed than the data rate of the input video.

For example, a standard video data rate for the input video supplied to the frame reorderer 10 is 30.5 MHz. However, if the compressor 400 is operated at a basic video data rate of, say, 27 MHz, it has the ability to process the input video data of a GOP once for trial compression (in which the auto quantiser in fact operates at a fixed quantisation level) and then again for final compression in which the bit allocator 330 uses the quantities of data generated during trial compression to control the auto quantiser (now working with a variable quantisation factor).

If, for example, a 12 frame GOP is being processed and it is desired to perform trial quantisation on 4 frames of the GOP, the compressor 400 can be operated at ⅓ of the basic video data rate of 13.5 MHz, ie 18 MHz.

Figure 9:
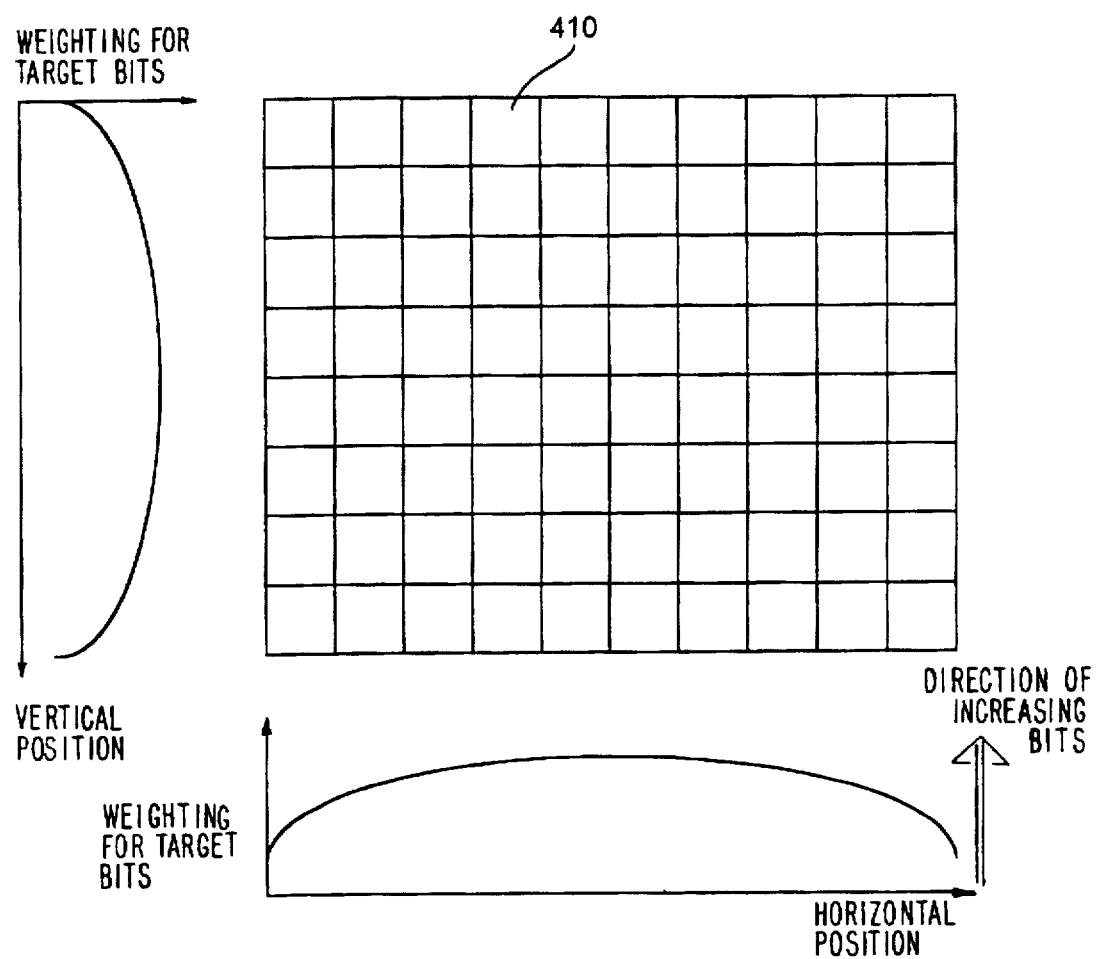
FIG. 9 is a schematic diagram illustrating the weighting of target bit rates.

Finally, FIG. 9 is a schematic diagram illustrating the weighting of target bit rates within an image.

As already described, target bit rates can be allocated to individual macroblocks, groups of macroblocks, slices, stripes and various other shaped blocks within an image. In the example shown in FIG. 9, separate target bit rates are allocated to individual code blocks 410 of an image.

A weighting is applied to the target bit rates for blocks of the image, so that blocks towards the centre of the image are given higher target bit rates, all other factors being equal. This is done for two main reasons:

(a) the viewer's centre of attention tends to be the middle of the picture, and so the viewer tends to notice coding errors more in the centre of the picture than at the edges, and (b) many domestic television sets overscan so that the extreme periphery of the picture is not seen by the home viewer at all.

Accordingly, the allocation scheme weights the allocation towards the centre of the pictures. This weighting towards the centre is also of particular benefit with so-called "letterbox" film transmission.

The graphs at the side and bottom of FIG. 9 illustrate one possible envelope for weighting coefficients to be applied to the target bit rates for different blocks in the image.

In all of the above schemes for allocating target bit rates, each block, slice or image is allocated at least a predetermined minimum (non-zero) target bit rate by the bit allocator. This allows for image content not anticipated by the bit allocator and avoids areas of the picture being allocated such a small target bit rate that the image cannot be encoded.

In another preferred feature, the target bit rates (and in turn the degree of compression applied) can be varied in direct dependence on the picture type. In particular, in an I:B:P system a B picture (or areas of a B-picture) can be allocated a lower TBR than other pictures, since it is not used as a reference for any other pictures. This tends to lead to a higher bit allocation to pictures which are used as references for other pictures. However, although it may be expected that the subjective quality of the more harshly quantised images would then suffer, in fact, because the reference pictures are better, the non-reference pictures can also improve.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Video data compression apparatus in which successive groups of two or more images are encoded, each encoded group of images comprising at least one intra-image encoded image and at least one inter-image encoded image, said apparatus comprising:

(i) a data quantity allocator for allocating respective quantities of output encoded data for each image in said group of images according to an allocation ratio between intra-image encoded images and inter-image encoded images dependent on said quantities of encoded data generated during encoding of a preceding group of images;

(ii) means for detecting a scene change in said group of images;

(iii) means for resetting the allocation of output encoded data for images in a group of images to a default allocation ratio if a scene change is detected in said group of images; and (iv) an encoder for encoding each image of said group of images in accordance with said quantities of output encoded data allocated to that image.

2. Apparatus according to claim 1, in which each group of images has:

at least one inter-image encoded image used as a reference for another inter-image encoded image; and at least one inter-image encoded image not used as a reference for other inter-image encoded images.

3. Apparatus according to claim 1, comprising means for detecting a degree of detail in each image of said group of images.

4. Apparatus according to claim 3, in which a degree of detail detecting means comprises means for detecting said variance of pixel values in each image of said group of images.

5. Apparatus according to claim 3, in which said scene change detecting means comprises means for detecting a change of more than a predetermined amount between said degree of detail in successive images.

6. A method of video data compression in which successive groups of two or more images are encoded, each encoded group of images comprising at least one intra-image encoded image and at least one inter-image encoded image, said method comprising the steps of:

(i) allocating respective quantities of output encoded data for each image in said group of images according to an allocation ratio between intra-image encoded images and inter-image encoded images dependent on said quantities of encoded data generated during encoding of a preceding group of images;

(ii) detecting scene changes in said group of images;

(iii) resetting said allocation of output encoded data for images in a group of images to a default allocation ratio if a scene change is detected in that group of images; and (iv) encoding each image of said group of images in accordance with said quantities of output encoded data allocated to that image.

* * * * *